UNITED STATES PATENT OFFICE.

WILLIAM TWEEDDALE, OF TOPEKA, KANSAS.

PROCESS OF PURIFYING WATER.

SPECIFICATION forming part of Letters Patent No. 360,126, dated March 29, 1887.

Application filed June 18, 1885. Serial No. 169,121. (No specimens.)

*To all whom it may concern:*

Be it known that I, WILLIAM TWEEDDALE, a citizen of the United States, residing at the city of Topeka, in the county of Shawnee and State of Kansas, have invented a new and useful process for purifying water of its organic contents, of its sulphates and carbonates of lime, magnesia, and iron held in solution, and of mud held in suspension, of which the following is a specification.

The water to be purified is put into a vessel of any desired capacity, when, for eliminating its organic contents, it is set into violent commotion either by a system of steam jets or currents, accompanied by a moderate amount of atmospheric air, or by an air-compressor, or by any other desired mechanical device, and a quantity of the protoxide of iron in a finely granulated or comminuted form is thrown in in the proportion of about half a pound to a thousand gallons of water, by which means the organic matter of the water is oxidized and its residuum resolved substantially into carbon oxides and ammonia. After the introduction of the protoxide of iron and the continuous agitation of the water for about fifteen minutes, a full supply of atmospheric air is admitted with the steam, and the requisite amount of a solution of carbonate of soda, determined from a previous analysis of the water, is thrown in to resolve the lime, magnesia, and iron of the sulphates into carbonates, which will, when the water becomes quiescent, be thrown down as precipitates. After the introduction of the carbonate of soda, the water is kept in violent commotion for about fifteen minutes, when the requisite amount of a clear maximum or saturated solution of lime, determined by the analysis above referred to, is thrown in to resolve the bicarbonates which are held in solution into simple carbonates, which, as above stated, are thrown down as precipitates. After the introduction of the clear lime-water the whole body of water is kept in violent commotion for about fifteen minutes, during which time the residuum of organic matter now held in suspension becomes agglomerated with the particles of the carbonates and of the oxide of iron and mud. After the fifteen minutes of agitation, the water is left to itself to settle. The agglomerated particles of the organic residuum, oxide of iron, carbonates, and mud are now speedily thrown down, and after about forty-five minutes the water is purified, ready for use.

In some forms of mud the precipitation may be accelerated by throwing in perchloride of iron in the proportion of about one grain to a thousand gallons.

I am familiar with Patents Nos. 293,749 and 293,883, issued to John W. Hyatt, February 19, 1884, and also with the matter referred to as appearing on page 78 of Van Nostrand's Engineering Magazine, July, 1885, and I herewith disclaim all title to any of the matters presented in said references.

What I claim as my invention, and desire to secure by Letters Patent, is—

The process of purifying water of its organic contents, of its sulphates and bicarbonates of lime, magnesia, and iron held in solution, and of mud held in suspension, consisting in the introduction of the protoxide of iron into the water to be purified while it is in violent commotion, and, after about fifteen minutes of continued agitation, the addition of a certain amount of a solution of carbonate of soda, and again, after another fifteen minutes of continued agitation, the addition of a certain amount of a clear maximum or saturated solution of lime, after which the agitation is continued for another fifteen minutes, when the water is left to clear itself by precipitation, all substantially as hereinbefore described.

WM. TWEEDDALE.

Witnesses:
 CHAS. D. MOORE,
 WM. H. POOR.